United States Patent
Nolsoe

(10) Patent No.: US 8,147,298 B2
(45) Date of Patent: Apr. 3, 2012

(54) APPARATUS FOR DETACHING, SEPARATING AND COLLECTING ORGANIC MATERIALS

(76) Inventor: Helgi Nolsoe, Argir (DK)

( * ) Notice: Subject to any disclaimer, the term of this patent is extended or adjusted under 35 U.S.C. 154(b) by 127 days.

(21) Appl. No.: 12/742,403

(22) PCT Filed: Nov. 12, 2008

(86) PCT No.: PCT/IB2008/003045
§ 371 (c)(1),
(2), (4) Date: Jun. 23, 2010

(87) PCT Pub. No.: WO2009/063294
PCT Pub. Date: May 22, 2009

(65) Prior Publication Data
US 2010/0255766 A1    Oct. 7, 2010

(30) Foreign Application Priority Data

| | | |
|---|---|---|
| Nov. 12, 2007 | (DK) | ................................. 2007 01591 |
| May 8, 2008 | (DK) | ................................. 2008 00658 |
| Sep. 22, 2008 | (DK) | ................................. 2008 01315 |

(51) Int. Cl.
*A22C 25/14* (2006.01)

(52) U.S. Cl. ...................................................... 452/106

(58) Field of Classification Search .......... 452/106–114, 452/118, 119–123
See application file for complete search history.

(56) References Cited

U.S. PATENT DOCUMENTS

| | | | |
|---|---|---|---|
| 719,948 A | | 2/1903 | Merriam |
| 4,993,116 A | * | 2/1991 | Urushibara et al. .......... 452/116 |
| 5,261,854 A | * | 11/1993 | Eiriksson ........................ 452/19 |
| 5,628,680 A | * | 5/1997 | Hjorth ............................ 452/106 |
| 5,735,735 A | * | 4/1998 | Hahn et al. .................... 452/119 |
| 5,980,376 A | * | 11/1999 | Grosseholz et al. .......... 452/116 |
| 6,354,932 B1 | * | 3/2002 | Lee ................................ 452/122 |
| 6,368,203 B1 | * | 4/2002 | Puretz ............................. 452/81 |

FOREIGN PATENT DOCUMENTS

| | | |
|---|---|---|
| SU | 1127561 | 12/1984 |
| SU | 1321394 | 7/1987 |
| WO | WO 03/013263 | 2/2003 |
| WO | WO 2008/055509 | 5/2008 |

OTHER PUBLICATIONS

International Search Report on related PCT application (PCT/IB2008/003045); International Searching Authority (EPO) dated Feb. 16, 2009.

* cited by examiner

*Primary Examiner* — Richard Price, Jr.
(74) *Attorney, Agent, or Firm* — Klein, O'Neill & Singh, LLP

(57) ABSTRACT

Apparatus for detaching, separating and collecting organic materials having different density; especially liver from fish entrails, which comprises a tank furnished with water or salt water and encasing a conveyor with carrier plates oriented across the direction of movement of the conveyor, and further is provided with an inlet and an outlet for the organic material. The tank also has detaching tools which comprises a stationary part and a movable part. The stationary part comprises a bracket plate with a curved cutting surface extending away from a free cutting edge of the bracket. The movable part comprises at least one detaching tool/knife, which moves or rotates along the cutting edge and is oriented in a small angle or no angle to the edge, wherein the curve form of the surface is in conformity with the path of the knife/knives; and further has synchronizing device which allow a knife to pass by the cutting edge simultaneously with one of the carriers passing by on the opposite end of the cutting edge.

9 Claims, 5 Drawing Sheets

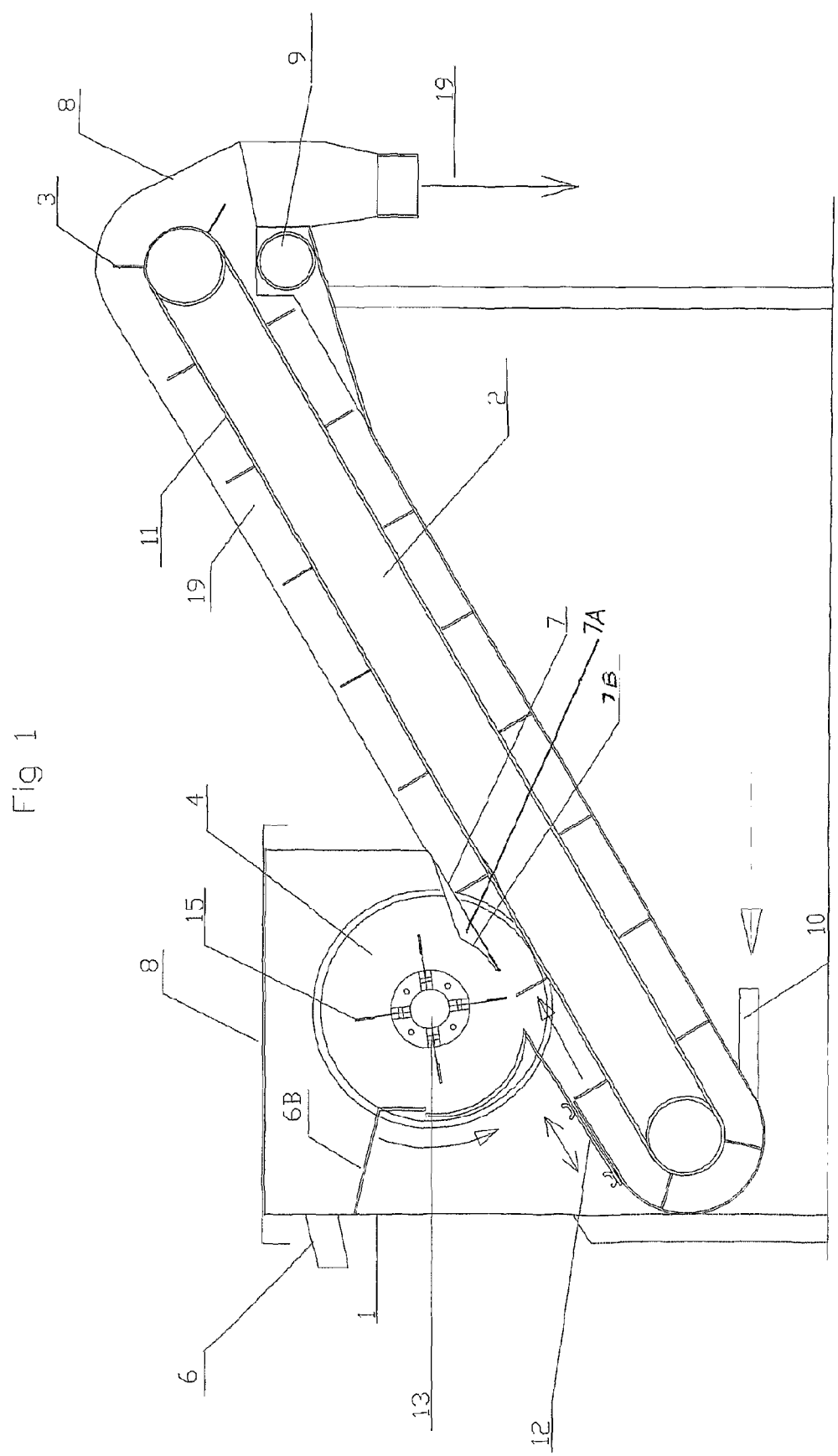

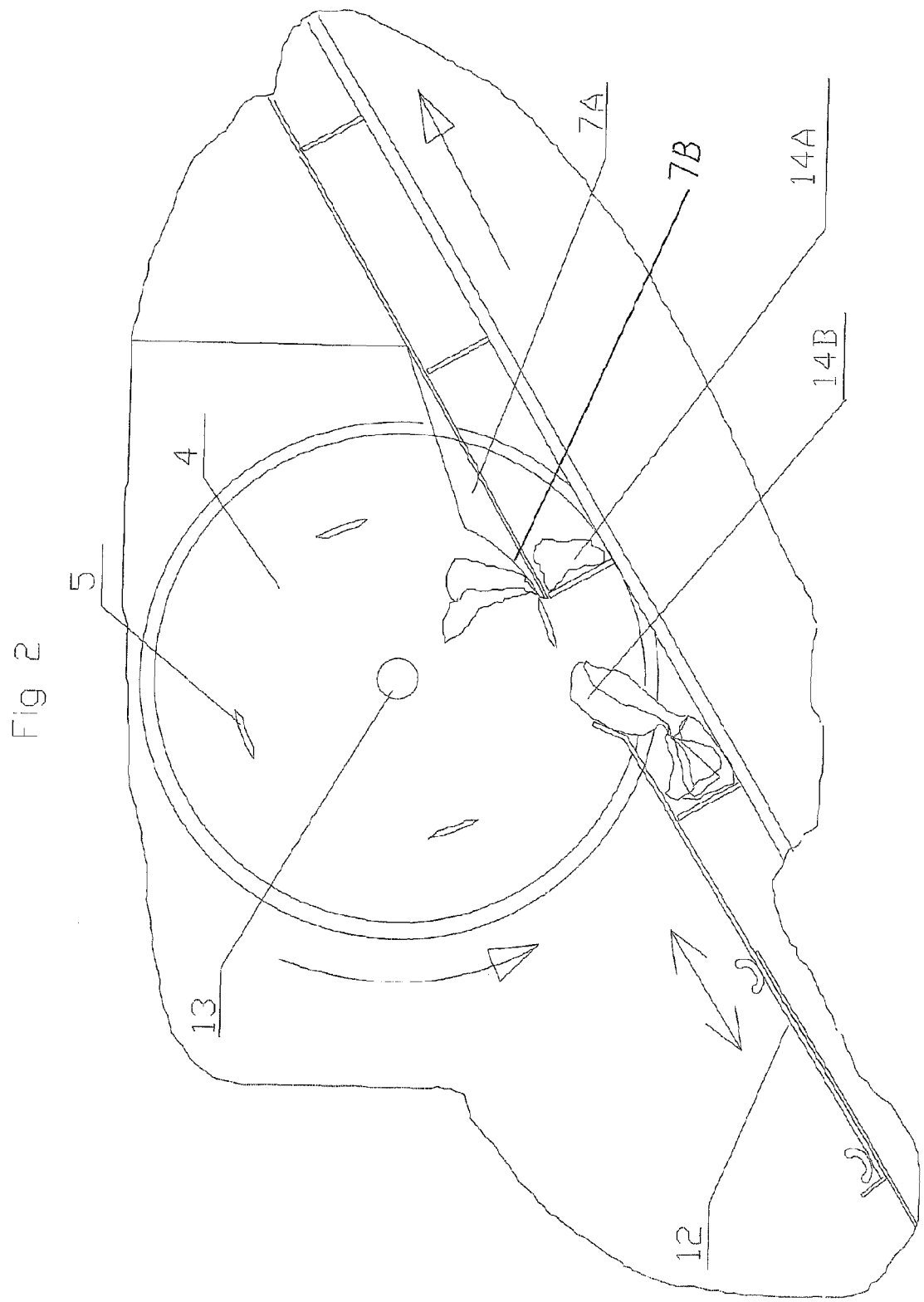

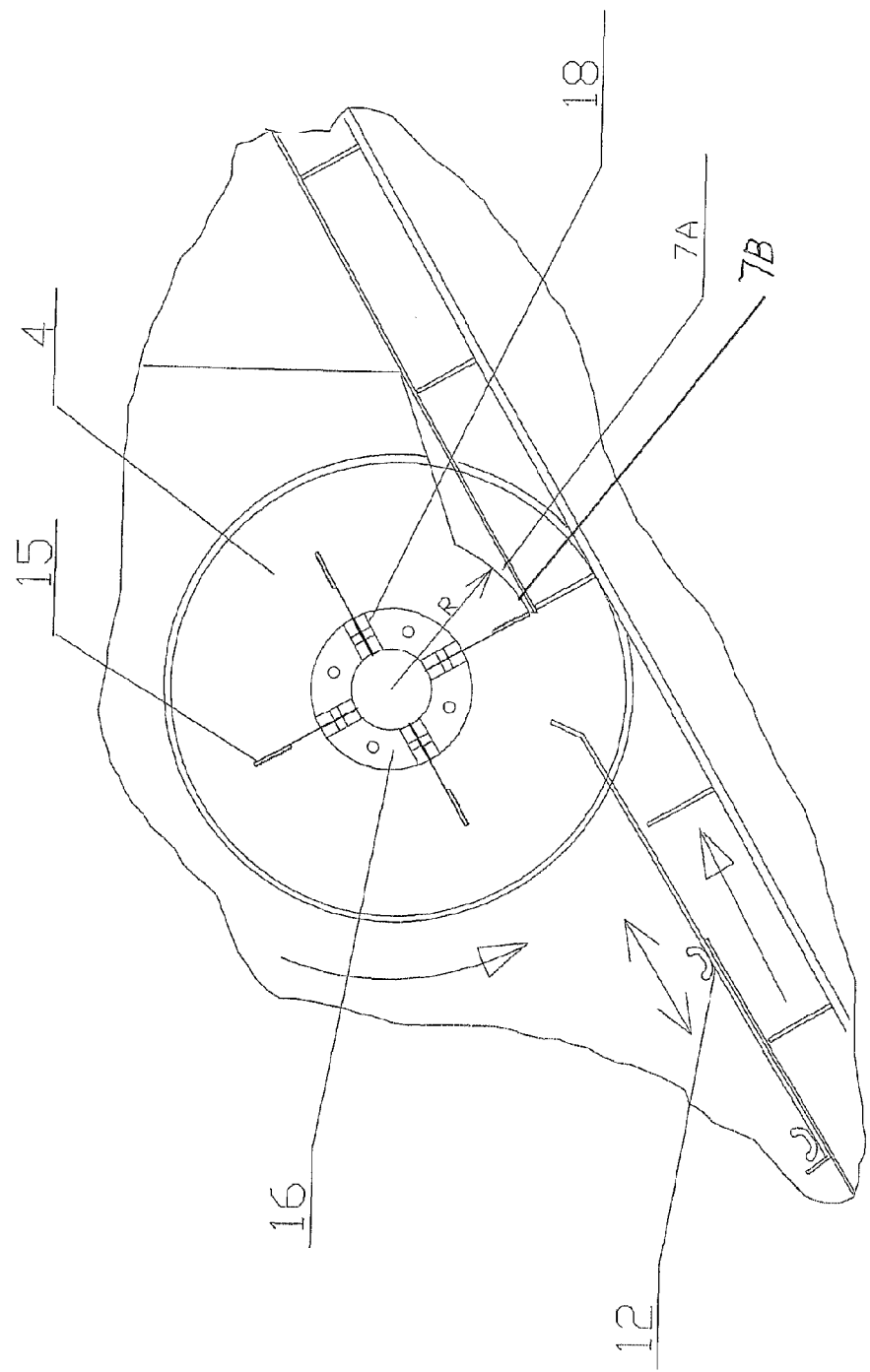

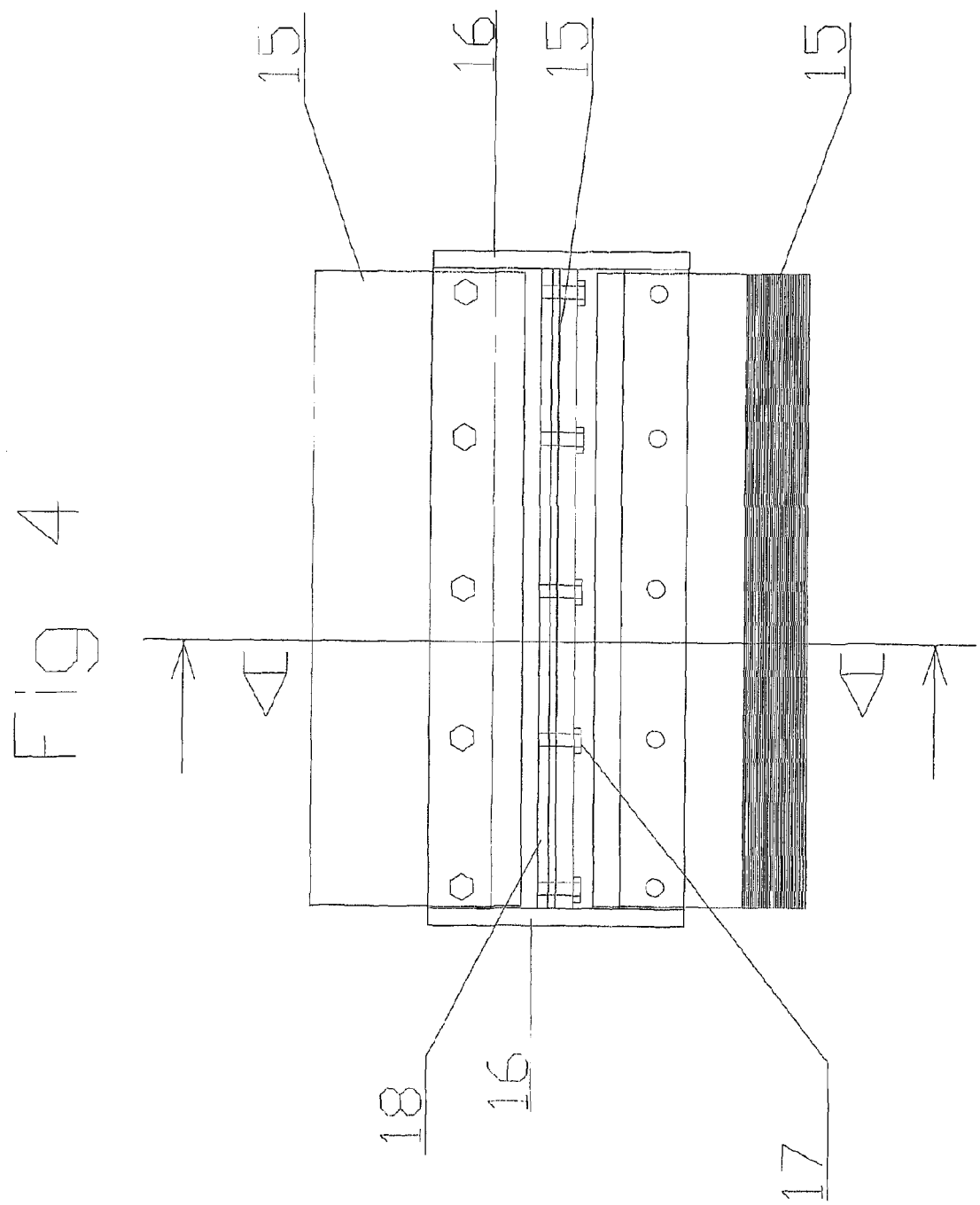

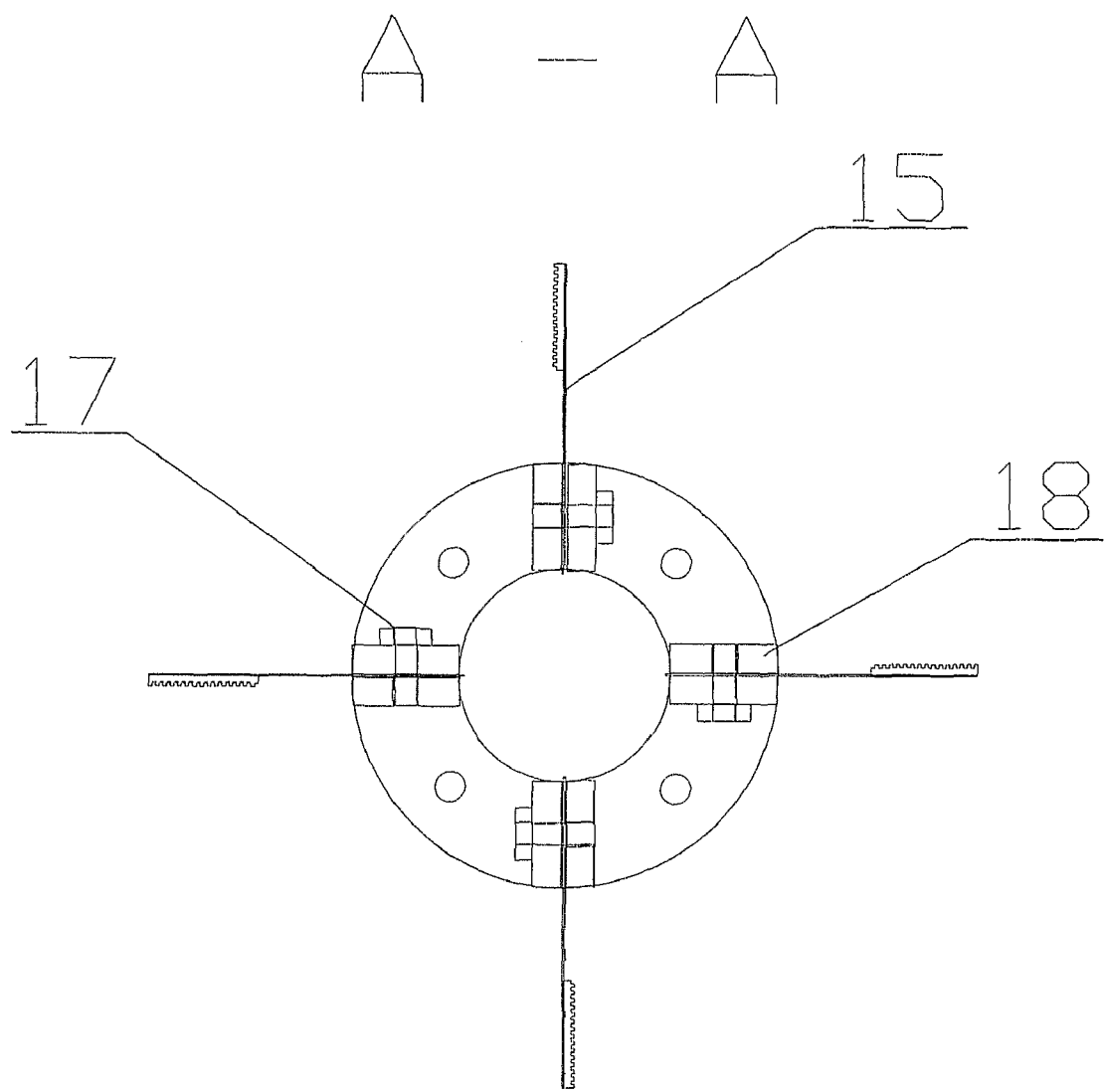

APPARATUS FOR DETACHING, SEPARATING AND COLLECTING ORGANIC MATERIALS

CROSS-REFERENCE TO RELATED APPLICATION

This application is a national phase filing, under 35 U.S.C. §371(c), of International Application No. PCT/IB2008/003045, filed on Nov. 12, 2008, the entire contents of which are hereby incorporated by reference.

FEDERALLY SPONSORED RESEARCH OR DEVELOPMENT

Not Applicable

FIELD OF INVENTION

The invention relates to an apparatus for detaching, separating and collecting organic materials, especially entrails in the fishing industries. Despite the description of the invention being concerned with the industry, the invention is not meant to be limited to the fishing industry only.

BACKGROUND

Fish liver is usually recovered from entrails in a manual process following cleansing of fish on a fishing vessel. Cleansing fish can be carried out as either a manual or an automatic process, wherein fish are slit along the stomach and all of the entrails are removed in order to detach and separate the liver from the entrails.

If recovery of the liver involves too much labour, it may be decided to allow it to go to waste, because the required labour resources are either too expensive or not available onboard the vessel. Especially with small fish, recovery of the liver would not be profitable.

Accordingly, only fairly small parts of liver from catches at sea are brought into the landing places and exploited commercially.

In order to exploit these valuable resources, efforts have been invested in developing an automatic process, wherein differences in the density of liver relative to the remainder of the entrails are the main principle of the solution.

From e.g. SU 1321394 A1 "Apparatus for separating liver from entrails of dressed fish in fluid medium" and from SU 1127561 A1 "Apparatus for separating products from impurities" it is known to let the entrails float in a fluid, e.g. fresh water or salt water, whereby the difference in density results in the light liver floating free of the entrails and accordingly provides easier gripping access.

Water is also used to keep the liver afloat in SU 1576120 A1 "Device for cleaning fish" in order to cleanse liver from nematodes and the like. Moreover, separation of organic materials having different density makes up the substance of EP 1447007 A1 "A method and a plant for preparing shrimps", in which shrimp meat, shrimp shells and shrimp eggs are separated from boiled shrimps.

Based on all the patents mentioned above essentially only the apparatus described in SU 1321394 A1 would be able to detach fish liver from entrails, but this apparatus has a very complex structure, and it is doubtful if it would work in the embodiment shown. It is a big disadvantage that in cases where all the entrails would sink due to a high density, the liver would follow the entrails and go to waste, because the apparatus is not provided with means to avoid the liver being carried on by the winged wheel shown (ref. 3).

The density of the entrails of fish varies based on variations of oil content of the liver and the content of the fish stomach, which can be filled with shellfish with a fairly high density. This means that, even in salt water, a big part of the entrails would sink to the bottom.

Moreover it is a disadvantage of the apparatus if there is a desire to use other parts of the entrails e.g. the roe, as it has to be removed before being led to the apparatus. Otherwise it would be carried with the waste material and most likely become crushed by the wing wheels.

The purpose of the present invention is to recover more of the liver than it is possible with known apparatuses.

SUMMARY

The purpose of the present invention is to provide an apparatus for detaching, separating and collecting organic materials having different densities, such as fish liver and fish entrails. The apparatus comprises a tank furnished with water or salt water and encasing a conveyor with carrier plates oriented across the direction of movement of the conveyor, the tank being further provided with an inlet and an outlet for the organic materials. The tank also contains a detaching mechanism comprising a stationary part and a movable part, the stationary part comprising a bracket plate having a curved cutting surface extending away from a free cutting edge of the bracket, the movable part comprising at least one detaching tool or knife that moves or rotates past the cutting edge and that may advantageously be oriented parallel, or nearly parallel, to the cutting edge, wherein the curved form of the cutting surface is in conformity with the path of the detaching tool or knife. The detaching mechanism and the conveyor are operated in synchronism, allowing the tool or knife to pass by the cutting edge simultaneously with one of the carriers passing by on the opposite end of the cutting edge.

Entrails of fish are entered into the tank through an inlet and are transported through the water in a position between succeeding carriers on the conveyor and forward to the cutting edge, which detaches the liver from the remainder of the entrails at this point, from where the liver and the entrails follow separate paths and are collected later.

In an advantageous embodiment of the invention, the stationary cutting surface and the path to be followed by the movable detaching tool(s) have essentially identical centres of curvature and accordingly create a curved path along which the liver can become detached, cut or torn away from the remainder of the entrails. The curved path could be a section of a curve extending between anything from 0° to 180°, preferably between 5° to 60°.

The detachment tools mentioned above are meant to include any suitable means e.g. knives, scrapers, spring steel strips, steel wire etc., which will allow the liver to be detached from the remainder of the entrails when meeting the cutting edge.

In a further embodiment at least one detaching tool is supported by at least one toothed wheel, preferably two toothed wheels, which are driven by a drive mechanism driving the conveyor and keeping the carriers on the conveyor in synchronization with the detaching tools until their encounter with the cutting edge.

In another embodiment of the invention at least one oblong detaching tool is supported by a rotary cage-like structure connected with the toothed wheels and bridging the width of the conveyor, which cage comprises two ring-shaped discs interconnected by means of evenly distributed rods axially aligned with the axis through said two discs, and fixtures on the discs to attach the oblong tools and adjustment means to adjust the distance and the orientation of the tools relative to the cutting edge.

In order to further secure that the entrails are transported forward to the cutting edge, an adjustable guide panel is provided in the tank in such position relative to the detaching tools and the carriers that said panel, being submerged in the water and mounted on the side members of the conveyor, will guide the floating organic material, e.g. fish entrails, in between two succeeding detaching tools, while the non-floating material is carried forward to the cutting edge by the carriers.

Preferably, each carrier is chosen to have at least the same height as the entrails minus the liver.

During use at sea, the apparatus is preferably provided with a closed top lid and a splash plate in order to counteract water splashes in the tank due to sea waves causing thrusting movements.

Moreover, a method for use of an apparatus according to the invention has been provided comprising the following steps:
- to provide a tank with fresh water or salt water,
- to introduce organic material e.g. fish entrails through the inlet and under the conveyor,
- to push the organic material, a first part thereof having a low density and floating above a second part thereof having a higher density, against the cutting edge by means of the carriers,
- to detach the first part of low density from the second part of higher density while passing along the cutting edge,
- to separate the detached parts of the organic material in a part of low density guided to the outlet, and a part of high density transported by the conveyor out of the tank, and
- to collect the separated parts from the outlet and from the conveyor outlet, respectively.

BRIEF DESCRIPTION OF THE DRAWINGS

A description of embodiments of the invention in more details is provided below with reference to the drawings, wherein:

FIG. 1 shows an apparatus according to the invention,

FIG. 2 is a detailed side view of the detaching tools/cutting tools in a first embodiment of the invention, FIG. 3 a detailed view of another embodiment of the detaching tools and a guide panel, FIG. 4 a plan view of the detaching tools in a second embodiment, and FIG. 5 is a cross sectional view at A-A in FIG. 4.

DETAILED DESCRIPTION OF THE INVENTION

The apparatus according to the invention (cf. FIGS. 1-2) comprises a tank 1 being provided with fresh water or salt water by way of a control device (not shown) and encasing a conveyor 2 being positioned in an inclined position relative to horizontal. The conveyor 2 is provided with a number of carrier plates 3 extending at a right angle from the conveyor belt 11 and extending across the direction of movement of the conveyor. Furthermore, the tank 1 has inlets 9, 10 for organic material and water, respectively, and also outlets 6, 19 for removal of detached organic material e.g. fish liver 14B and entrails 14A and water. The tank 1 could be provided with a splash plate 6B positioned at the outlet 6, in order to prevent a large amount of water being forced out of the tank 1 in heavy seas.

A top lid 8 may be positioned on top of the tank 1 in order to counteract water splashes in the tank 1 during transport at sea and it can also cover the conveyor, which may be an integrated part of the tank.

The tank 1 includes detaching tools comprising a stationary part in form of a bracket plate 7 having a curved cutting surface 7A with a cutting edge (7B), and a movable part having at least one detaching tool 5, 15 (in the example shown there are four such tools) extending laterally from a toothed wheel 4 rotating on an axis 13. Preferably, there will be two adjustable toothed wheels 4 adjustable in the longitudinal direction of the conveyor, wherein the liver detaching tools can be fine-tuned relative to the cutting surface 7A, said wheels 4 being positioned at respective ends of the tools 5, 15. Each tool 5, 15 passes by the cutting edge 7B of the bracket plate 7 along a path that conforms to the curvature of the cutting surface 7A over a section of a curve ranging between 0° and 180°, preferably between 5° and 60°.

The tools 5, 15 are oriented at an angle or parallel to the surface 7A of the cutting edge 7B. Moreover, the tool 5, 15 and the cutting edge 7B are substantially oriented at an angle of 90° relative to the direction of the movement of products, wherein at least one of the tools and the cutting edge are oriented at an angle slightly different from 90°, whereby the cutting contact point between the knife 5 and the cutting edge 7B is moving continuously along said edge (in the plane of the paper in FIG. 2).

Additionally the movement of the tools 5, 15 extending laterally from a toothed wheel 4 is synchronized with and driven by the conveyor drive, wherein each tool 5, 15 can pass by the cutting edge 7B at the same time as a corresponding one of the carriers 3 passes the opposite end of the cutting edge 7B, so that a carrier 3 will always arrive simultaneously with a tool 5, 15.

Preferably, the cutting surface 7A and the path followed by the at least one tool 5, 15 have identical centres of curvature, whereby there will be more time to perform the detaching or cutting tasks.

In a second embodiment of the invention (FIGS. 4-5) an oblong tool 15 made of stainless spring steel having a mounting with a rugged surface fixed thereon, wherein the oblong tool 15 is supported by a rotary cage-like structure, which is connected to toothed wheels 4 and bridges the width of the conveyor 2, said cage being comprised of two ring-shaped discs interconnected by evenly distributed rods 18 axially aligned with the axis 13 through said discs, and fixtures 16 and adjustment means 17, e.g., screws or bolts, to secure the oblong tools 15 and to adjust the distance between the tools 15 and the cutting surface 7A. The toothed wheels 4 can advantageously serve as discs.

The tank 1 further comprises an inlet 10 for water e.g. seawater, preferably but not necessarily positioned near the bottom of the conveyor 2 in order to create a constant flow through the outlet 6 (FIG. 1). In addition, the tank 1 has an inlet 9 for organic material, said inlet being preferably positioned on the tank 1 underneath the outlet end of the conveyor 2 resulting in the organic material being transported between succeeding carriers. In this way floating parts of entrails are forced down under the water surface and are carried forward to the cutting edge.

Generally the conveyor 2 is provided with an adjustable guide panel 12 bridging the width of the conveyor 2 and reaching in between the toothed wheels 4 upstream of the movable tools 5, 15 thereby guiding the organic material introduced through the inlet 9 and the water introduced together with the organic material or water through the inlet 10, forward to the cutting edge 7B. Here the parts 14A, 14B of entrails are separated at the cutting edge 7B and move further along respective sides of the bracket plate 7 to corresponding outlets 6, 19 by means of the water flow and the conveyor, respectively.

Due to the difference in density the light fish liver 14B will float above the remainder 14A of the entrails and will become separated at the cutting edge 7B.

The fish liver 14B leaves the tank 1 together with the water flow, and the remainder 14A of the entrails exits with the conveyor and continues to e.g. a chute, a belt, a sieve, a pump or the like.

Preferably the height of the carriers is chosen to be at least equal to that of the entrails minus the liver.

Finally, it should be noted that the invention could be used in any similar application, wherein a difference in density exists, despite the type of organic material to be treated and no matter if said material is coherent or not. Furthermore, it should be stressed, that the knives described in the examples could also be e.g. scrapers, spring steel strips, steel wires or the like.

The invention claimed is:

1. Apparatus for processing organic material having first and second parts of different density; comprising:
   a tank having a first inlet for organic material and a second inlet for water;
   a conveyor mounted in the tank for movement in a predetermined direction, the conveyor including a plurality of carrier plates configured and located so as to carry organic material and water on the conveyor between successive carrier plates;
   a detaching mechanism mounted in the tank and comprising a stationary part and a movable part, the stationary part comprising a plate having a curved cutting surface extending away from a cutting edge, the movable part comprising a detaching tool that is movable past the cutting edge and along the curved cutting surface, wherein the curved cutting surface is in conformity with the path of the detaching tool, and wherein the movable part is operable in synchronism with the conveyor so that the detaching tool arrives at the cutting edge substantially simultaneously with one of the plurality of carrier plates so as to separate the first and second parts of the organic material at the cutting edge.

2. Apparatus according to claim 1, wherein the cutting surface and the path followed by the detaching tool have substantially identical centers of curvature.

3. Apparatus according to claim 1, wherein the detaching tool is supported on a toothed wheel driven with the conveyor so as to provide synchronization between the carrier plates and the detaching tool.

4. Apparatus according to claim 1, wherein the detaching tool is supported on a rotary structure that bridges the conveyor, wherein the rotary structure comprises:
   two opposed discs defining a rotational axis therebetween, the discs being interconnected by a plurality of rods axially aligned with the axis through the two discs; and
   an adjustable fixture by which the tool is attached to the discs so as to permit an adjustment of the position of the tool relative to the cutting surface.

5. Apparatus according to claim 4, wherein each of the discs comprises a toothed wheel.

6. Apparatus according to claim 1, wherein the movable part includes a plurality of detaching tools, and wherein a guide panel is provided on the conveyor in a position relative to the detaching mechanism and the carrier plates so as to guide the organic material to the cutting edge between two successive detaching tools.

7. Apparatus according to claim 6, wherein the first part of the organic material comprises fish entrails, and the second part of the organic material comprises a fish liver attached to the fish entrails; and wherein each of the carrier plates has a height that is at least equal to that of the fish entrails minus the fish liver.

8. Apparatus according to claim 1, wherein the tank includes first and second organic material outlets; wherein the conveyor is operable to convey the first part of the organic material to the first organic material outlet, and wherein the movable part of the detaching mechanism is operable to convey the second part of the organic material to the second organic material outlet.

9. A method for processing organic material having first and second parts, the first part having a higher density than the second part, the method comprising:
   (a) providing a tank having first and second outlets and containing a conveyor provided with a plurality of carrier plates configured to carry the organic material between successive carrier plates;
   (b) providing a detaching mechanism in the tank, the detaching mechanism including a movable detaching tool and a stationary part having a curved cutting surface extending from a cutting edge;
   (c) introducing the organic material and water onto the conveyor between successive carrier plates;
   (d) moving the conveyor so as to push the organic material against the cutting edge by means of the carrier plates and the detaching tool so as to detach the first part of the organic material from the second part thereof; and
   (e) conveying the first part to the first outlet with the detaching mechanism, while leaving the second part on the conveyor to be conveyed to the second outlet.

* * * * *